United States Patent
Yamazaki

(10) Patent No.: US 9,629,159 B2
(45) Date of Patent: *Apr. 18, 2017

(54) MOBILE COMMUNICATION SYSTEM, BASE STATION, AND USER TERMINAL

(71) Applicant: KYOCERA CORPORATION, Kyoto (JP)

(72) Inventor: Chiharu Yamazaki, Ota-ku (JP)

(73) Assignee: KYOCERA Corporation, Kyoto (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/431,042

(22) PCT Filed: Sep. 11, 2013

(86) PCT No.: PCT/JP2013/074516
§ 371 (c)(1),
(2) Date: Mar. 25, 2015

(87) PCT Pub. No.: WO2014/050557
PCT Pub. Date: Apr. 3, 2014

(65) Prior Publication Data
US 2015/0257153 A1    Sep. 10, 2015

Related U.S. Application Data

(60) Provisional application No. 61/705,904, filed on Sep. 26, 2012.

(51) Int. Cl.
*H04W 28/04*    (2009.01)
*H04W 72/04*    (2009.01)
(Continued)

(52) U.S. Cl.
CPC ........ *H04W 72/0453* (2013.01); *H04B 15/00* (2013.01); *H04W 24/02* (2013.01);
(Continued)

(58) Field of Classification Search
CPC ...... H04W 80/04; H04W 72/04; H04W 88/06
See application file for complete search history.

(56) References Cited

U.S. PATENT DOCUMENTS 8,705,438 B2    4/2014   Laroia et al.
2009/0016261 A1   1/2009   Laroia et al.
(Continued)

FOREIGN PATENT DOCUMENTS

JP    2010-533443 A    10/2010
WO    2009/009401 A1    1/2009
(Continued)

OTHER PUBLICATIONS

International Search Report; PCT/JP2013/074516; Nov. 19, 2013.
(Continued)

*Primary Examiner* — Andrew Lee
(74) *Attorney, Agent, or Firm* — Studebaker & Brackett PC

(57) ABSTRACT

A mobile communication system supports cellular communication in which data communication is performed between a network and a user terminal and D2D communication in which data communication is directly performed among two or more user terminals. The mobile communication system comprises: a cellular communication terminal that is a user terminal that performs the cellular communication; a D2D communication terminal that is a user terminal that performs the D2D communication; and a base station that assigns a radio resource that is used by the cellular communication terminal for the cellular communication. The base station transmits assignment information indicating a radio resource that may possibly be used by the cellular communication terminal from among D2D radio resources available in the D2D communication to the D2D communication terminal.

11 Claims, 9 Drawing Sheets

(51) Int. Cl.
*H04W 76/02* (2009.01)
*H04B 15/00* (2006.01)
*H04W 24/02* (2009.01)
*H04W 92/18* (2009.01)

(52) U.S. Cl.
CPC ....... *H04W 72/042* (2013.01); *H04W 76/023* (2013.01); *H04W 92/18* (2013.01)

(56) References Cited

U.S. PATENT DOCUMENTS

| | | | | |
|---|---|---|---|---|
| 2010/0093364 | A1* | 4/2010 | Ribeiro | H04W 72/082 455/452.2 |
| 2011/0282989 | A1 | 11/2011 | Geirhofer et al. | |
| 2012/0243431 | A1* | 9/2012 | Chen | H04W 72/0406 370/252 |
| 2012/0281683 | A1* | 11/2012 | Falconetti | H04J 11/0023 370/336 |
| 2013/0012221 | A1* | 1/2013 | Zou | H04W 72/10 455/452.1 |
| 2013/0102314 | A1* | 4/2013 | Koskela | H04W 36/0072 455/436 |
| 2013/0157676 | A1* | 6/2013 | Baek | H04W 76/023 455/452.1 |
| 2013/0230032 | A1* | 9/2013 | Lu | H04W 72/02 370/336 |
| 2014/0038653 | A1* | 2/2014 | Mildh | H04W 28/048 455/501 |
| 2014/0235234 | A1* | 8/2014 | Jang | H04W 36/18 455/426.1 |
| 2014/0286293 | A1* | 9/2014 | Jang | H04L 5/0044 370/329 |
| 2015/0023267 | A1* | 1/2015 | Lim | H04L 1/1854 370/329 |
| 2015/0078466 | A1* | 3/2015 | Zhou | H04W 56/004 375/260 |

FOREIGN PATENT DOCUMENTS

| | | |
|---|---|---|
| WO | 2011/050519 A1 | 5/2011 |
| WO | 2011/088619 A1 | 7/2011 |
| WO | 2011/143496 A1 | 11/2011 |

OTHER PUBLICATIONS

3GPP TR 22.803 V0.3.0 (May 2012); 3rd Generation Partnership Project; Technical Specification Group SA; Feasibility Study for Proximity Services (ProSe)(Release 12).

The extended European search report issued by the European Patent Office on Apr. 22, 2016, which corresponds to European Patent Application No. 13842839.6-1857 and is related to U.S. Appl. No. 14/431,042.

An Office Action; "Notice of Reasons for Rejection," issued by the Japanese Patent Office on Jun. 7, 2016, which corresponds to Japanese Patent Application No. 2014-538363 and is related to U.S. Appl. No. 14/431,042; with English language statement of relevance.

* cited by examiner

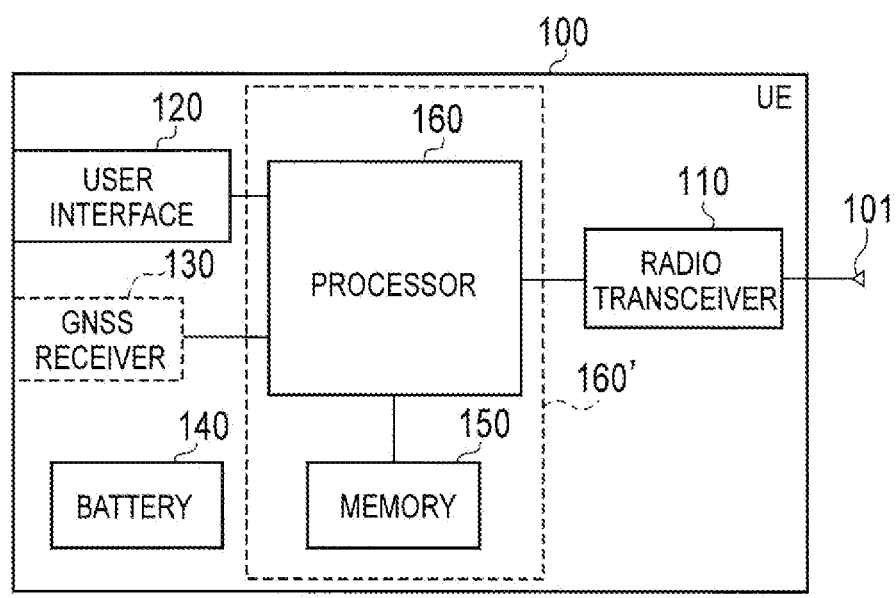
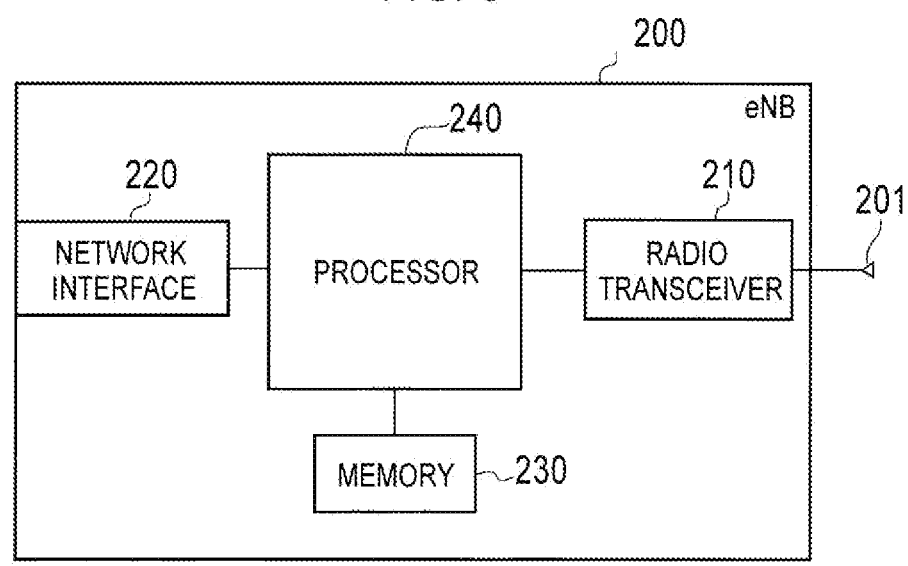

FIG. 12

MOBILE COMMUNICATION SYSTEM, BASE STATION, AND USER TERMINAL

TECHNICAL FIELD

The present invention relates to a mobile communication system that supports D2D communication, a base station and a user terminal in the mobile communication system.

BACKGROUND ART

In 3GPP (3rd Generation Partnership Project) which is a project aiming to standardize a mobile communication system, the introduction of Device to Device (D2D) communication is discussed as a new function after Release 12 (see non patent document).

In the D2D communication, a plurality of adjacent user terminals perform direct communication in a frequency band assigned to a mobile communication system. It is noted that the D2D communication is also called proximity service (Proximity Service) communication.

PRIOR ART DOCUMENT

Non-Patent Document

Non Patent Document 1: 3GPP technical report "TR 22.803 V0.3.0" May 2012

SUMMARY OF THE INVENTION

However, at present, since there are no specifications for appropriately controlling the D2D communication, it is difficult to allow the D2D communication to coexist with cellular communication (communication between a network and a user terminal).

Therefore, the present invention provides a mobile communication system, abase station and a user terminal, by which it is possible to appropriately control D2D communication.

A mobile communication system according to one embodiment supports cellular communication in which data communication is performed between a network and a user terminal and D2D communication in which data communication is directly performed among two or more user terminals. The mobile communication system comprises: a cellular communication terminal that is a user terminal that performs the cellular communication; a D2D communication terminal that is a user terminal that performs the D2D communication; and a base station that assigns a radio resource that is used by the cellular communication terminal for the cellular communication. The base station transmits uplink assignment information indicating a radio resource that may possibly be used by the cellular communication terminal from among D2D radio resources available in the D2D communication to the D2D communication terminal.

BRIEF DESCRIPTION OF THE DRAWINGS

FIG. 2 is a block diagram of UE.

FIG. 3 is a block diagram of eNB.

FIG. 12 is a diagram for illustrating a case in which D2D scheduling is performed at the initiative of eNB.

DESCRIPTION OF THE EMBODIMENT

Overview of Embodiment

Figure 1:
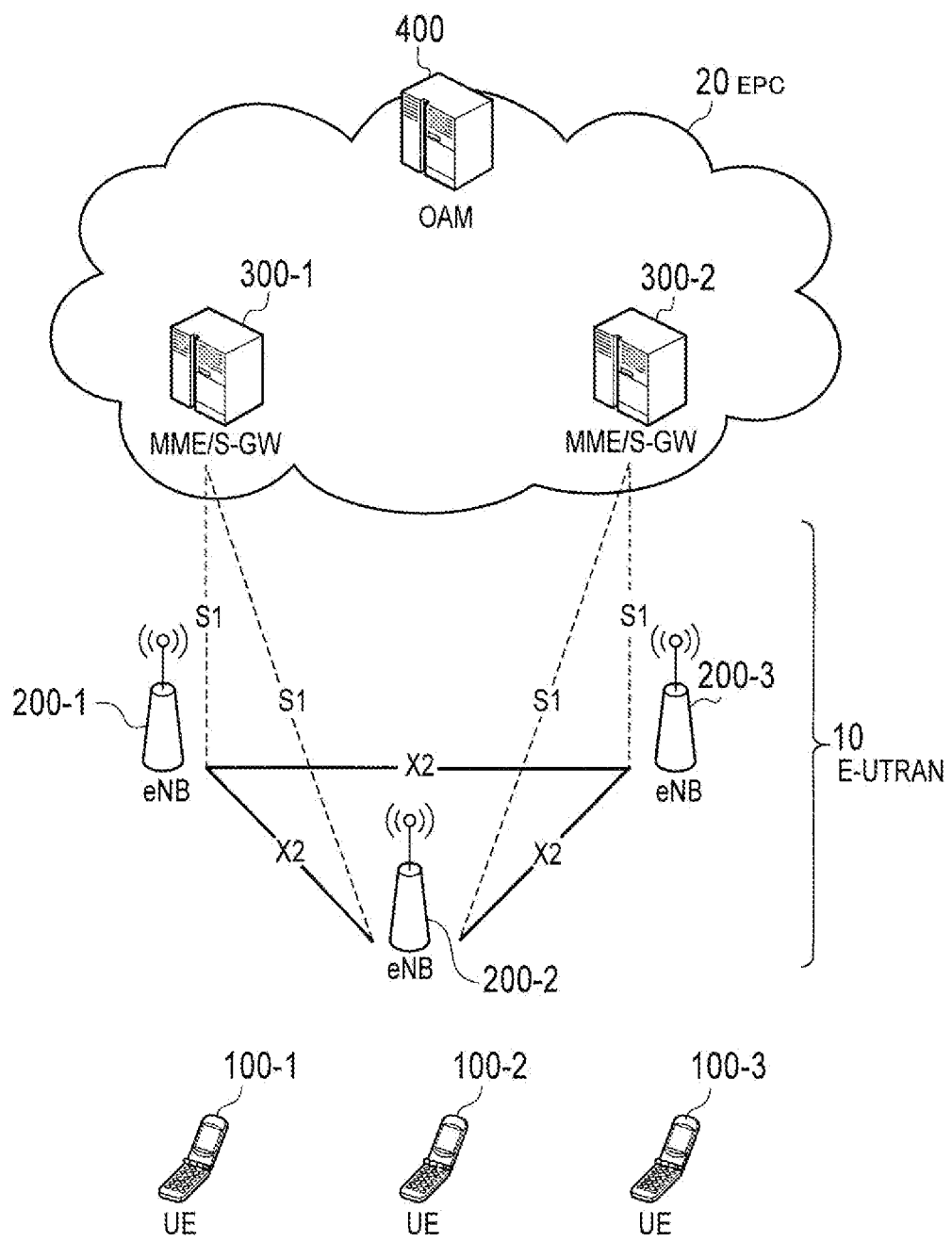
FIG. 1 is a configuration diagram illustrating an LTE system.

A mobile communication system according to an embodiment supports cellular communication in which data communication is performed between a network and a user terminal, and D2D communication in which data communication is directly performed among two or more user terminals. The mobile communication system includes a cellular communication terminal, which is a user terminal that performs the cellular communication, a D2D communication terminal, which is a user terminal that performs the D2D communication, and a base station that assigns a radio resource that is used by the cellular communication terminal for the cellular communication. The base station transmits assignment information indicating a radio resource that may possibly be used by the cellular communication terminal from among D2D radio resources available in the D2D communication to the D2D communication terminal. In this way, the D2D communication terminal is able to recognize the radio resource and avoid the occurrence of interference between the D2D communication and the cellular communication. Consequently, it is possible to allow the D2D communication to coexist with the cellular communication.

In a first embodiment, in the case of assigning the radio resource from among the D2D radio resources to the cellular communication terminal, the base station transmits the assignment information to the D2D communication terminal.

In a first embodiment, the radio resource is a radio resource that is used by the cellular communication terminal for an uplink of the cellular communication.

In a first embodiment, when D2D scheduling is performed at the initiative of the D2D communication terminal, the D2D communication terminal uses the assignment information from the base station for the D2D scheduling, wherein the D2D scheduling indicates radio resource assignment for the D2D communication. For example, the D2D communication terminal performing the D2D scheduling does not use the radio resource, which is indicated by the assignment information from the base station, for the D2D communication. Consequently, the D2D communication terminal is able to perform the D2D scheduling such that interference is prevented from occurring between the D2D communication and the uplink communication.

In a second embodiment, the assignment information includes information indicating a modulation scheme that is applied to an of the cellular communication by the cellular communication terminal. For example, on the basis of the information indicating the modulation scheme included in the uplink assignment information, the D2D communication terminal performs an interference cancellation process for interference received from the cellular communication terminal. In this way, even when interference occurs between the D2D communication and the uplink communication, the D2D communication terminal is able to cancel the interference from the cellular communication.

The base station may transmit the assignment information to the D2D communication terminal by using a radio network temporary identifier dedicated for the D2D communication. Consequently, it is possible to appropriately transmit the assignment information to the D2D communication terminal.

Alternatively, the base station may also transmit the assignment information to the D2D communication terminal in a broadcast manner.

In another embodiment, the radio resource is a radio resource that is used by the cellular communication terminal for a downlink of the cellular communication.

A base station according to the embodiment is abase station in a mobile communication system that supports cellular communication in which data communication is performed between a network and a user terminal, and D2D communication in which data communication is directly performed among two or more user terminals. The base station includes a control unit that assigns a radio resource, which is used in an uplink of the cellular communication, to a cellular communication terminal that performs the cellular communication. The control unit transmits assignment information indicating a radio resource that may possibly be used by the cellular communication terminal from among D2D radio resources available in the D2D communication to a D2D communication terminal that performs the D2D communication.

A user terminal according to the embodiment performs the D2D communication in a mobile communication system that supports cellular communication in which data communication is performed between a network and a user terminal, and D2D communication in which data communication is directly performed among two or more user terminals. The user terminal includes a reception unit that receives assignment information indicating a radio resource from a base station that assigns the radio resource to a cellular communication terminal that is a user terminal performing the cellular communication, wherein the radio resource may possibly be used by the cellular communication terminal from among D2D radio resources available in the D2D communication.

First Embodiment

Hereinafter, with reference to the accompanying drawings, description will be provided for an embodiment in which D2D communication is introduced to a mobile communication system (an LTE system) configured based on 3GPP standards.

(LTE System)

FIG. 1 is a configuration diagram of an LTE system according to the present embodiment.

As illustrated in FIG. 1, the LTE system includes a plurality of UEs (User Equipments) 100, E-UTRAN (EvolvedUniversal Terrestrial Radio Access Network) 10, and EPC (Evolved Packet Core) 20. The E-UTRAN 10 and the EPC 20 constitute a network.

The UE 100 is a mobile radio communication device and performs radio communication with a cell (a serving cell) with which a connection is established. The UE 100 corresponds to the user terminal.

The E-UTRAN 10 includes a plurality of eNBs 200 (evolved Node-Bs). The eNB 200 corresponds to a base station. The eNB 200 controls a cell and performs radio communication with the UE 100 that establishes a connection with the cell.

It is noted that the "cell" is used as a term indicating a minimum unit of a radio communication area, and is also used as a term indicating a function of performing radio communication with the UE 100.

The eNB 200, for example, has a radio resource management (RRM) function, a routing function of user data, and a measurement control function for mobility control and scheduling.

The EPC 20 includes MMEs (Mobility Management Entities)/S-GWs (Serving-Gateways) 300, and OAM (Operation and Maintenance) 400.

The MME is a network node for performing various mobility controls, etc., for the UE 100 and corresponds to a controller. The S-GW is a network node that performs transfer control of user data and corresponds to a mobile switching center.

The eNBs 200 are connected mutually via an X2 interface. Furthermore, the eNB 200 is connected to the MME/S-GW 300 via an S1 interface.

The OAM 400 is a server device managed by an operator and performs maintenance and monitoring of the E-UTRAN 10.

Next, the configurations of the UE 100 and the eNB 200 will be described.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 constitute a control unit.

The UE 100 may not have the GNSS receiver 130. Furthermore, the memory 150 may be integrally formed with the processor 160, and this set (that is, a chipset) may be called a processor 160'.

The antenna 101 and the radio transceiver 110 are used to transmit and receive a radio signal. The antenna 101 includes a plurality of antenna elements. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates a power to be supplied to each block of the UE 100.

The memory 150 stores a program to be executed by the processor 160 and information to be used for a process by the processor 160.

The processor 160 includes a baseband processor that performs modulation and demodulation, encoding and decoding and the like of the baseband signal, and a CPU (Central Processing Unit) that performs various processes by executing the program stored in the memory 150. The processor 160 may further include a codec that performs encoding and decoding of sound and video signals. The processor 160 implements various processes and various communication protocols described later.

FIG. 3 is a block diagram of the eNB 200. As illustrated in FIG. 3, the eNB 200 includes an antenna 201, a radio transceiver 210, a network interface 220, a memory 230, and a processor 240. The memory 230 and the processor 240 constitute a control unit. Please note that the memory 230 may be integrally formed with the processor 240, and this set (that is, a chipset) may be called a processor.

The antenna 201 and the radio transceiver 210 are used to transmit and receive a radio signal. The antenna 201 includes a plurality of antenna elements. The radio transceiver 210 converts the baseband signal output from the processor 240 into the radio signal, and transmits the radio signal from the antenna 201. Furthermore, the radio transceiver 210 converts the radio signal received by the antenna 201 into the baseband signal, and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes the baseband processor that performs modulation and demodulation, and encoding and decoding of the baseband signal and a CPU that performs various processes by executing the program stored in the memory 230. The processor 240 implements various processes and various communication protocols described later.

Figure 4:
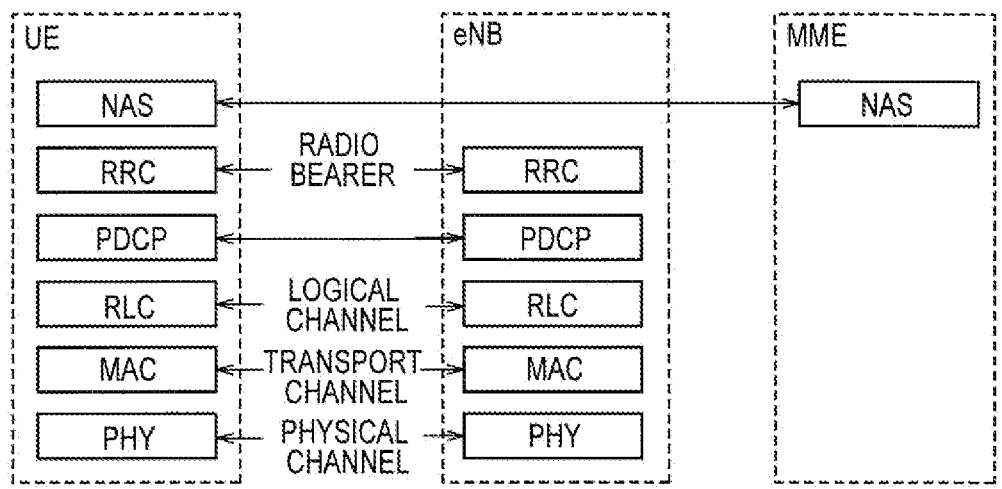
FIG. 4 is a protocol stack diagram of a radio interface in the LTE system.

FIG. 4 is a protocol stack diagram of a radio interface in the LTE system.

As illustrated in FIG. 4, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. The PHY layer provides a transmission service to an upper layer by using a physical channel. Between the PHY layer of the UE 100 and the PHY layer of the eNB 200, data is transmitted through the physical channel.

The MAC layer performs preferential control of data, and a retransmission process and the like by hybrid ARQ (HARQ). Between the MAC layer of the UE 100 and the MAC layer of the eNB 200, data is transmitted through a transport channel. The MAC layer of the eNB 200 includes MAC scheduler that determines an uplink and downlink transport format (a transport block size, a modulation and coding scheme, and the like) and an assignment resource block.

The RLC layer transmits data to an RLC layer of a reception side by using the functions of the MAC layer and the PHY layer. Between the RLC layer of the UE 100 and the RLC layer of the eNB 200, data is transmitted through a logical channel.

The PDCP layer performs header compression and decompression, and encryption and decryption.

The RRC layer is defined only in a control plane. Between the RRC layer of the UE 100 and the RRC layer of the eNB 200, a control message (an RRC message) for various types of setting is transmitted. The RRC layer controls the logical channel, the transport channel, and the physical channel in response to establishment, re-establishment, and release of a radio bearer. When an RRC connection is established between the RRC of the UE 100 and the RRC of the eNB 200, the UE 100 is in a connected state, and when the RRC connection is not established, the UE 100 is in an idle state.

A NAS (Non-Access Stratum) layer positioned above the RRC layer performs session management or mobility management, for example.

Figure 5:
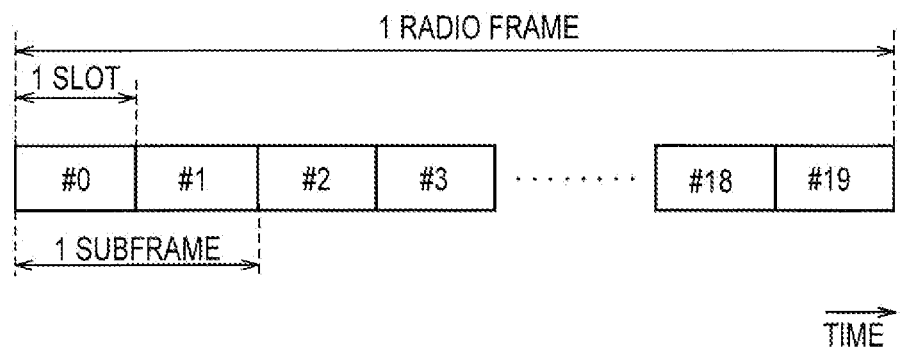
FIG. 5 is a configuration diagram of a radio frame used in the LTE system.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively. As a duplex scheme, one of a FDD (Frequency Division Duplex) scheme and a TDD (Time Division Duplex) scheme is used. However, in the present embodiment, the FDD scheme is mainly considered.

As illustrated in FIG. 5, the radio frame is configured by 10 subframes arranged in a time direction, wherein each subframe is configured by two slots arranged in the time-period direction. Each subframe has a length of 1 ms and each slot has a length of 0.5 ms. Each subframe includes a plurality of resource blocks (RBs) in a frequency direction, and a plurality of symbols in the time-period direction. Each symbol is provided at a head thereof with a guard interval called a cyclic prefix (CP). The resource block includes a plurality of subcarriers in the frequency direction. A radio resource unit configured by one subcarrier and one symbol is called a resource element (RE).

Among radio resources assigned to the UE 100, a frequency resource can be designated by a resource block and a time-period resource can be designated by a subframe (or slot).

In the downlink, an interval of several symbols at the head of each subframe is a control region mainly used as a physical downlink control channel (PDCCH). Furthermore, the remaining interval of each subframe is a region mainly used as a physical downlink shared channel (PDSCH). Moreover, in each subframe, cell-specific reference signals (CRSs) are distributed and arranged.

In the uplink, both ends in the frequency direction of each subframe are control regions mainly used as a physical uplink control channel (PUCCH). Furthermore, the center portion in the frequency direction of each subframe is a region mainly used as a physical uplink shared channel (PUSCH). Moreover, in each subframe, a demodulation reference signal (DMRS) and a sounding reference signal (SRS) are arranged.

(D2D Communication)

Next, the LTE system according to the present embodiment supports the D2D communication. Hereinafter, the D2D communication will be described in comparison with normal communication (cellular communication) of the LTE system. In the cellular communication, data communication is performed between the network (the eNB 200) and the UE 100. On the other hand, in the D2D communication, data communication is directly performed among two or more UEs 100.

Figure 6:
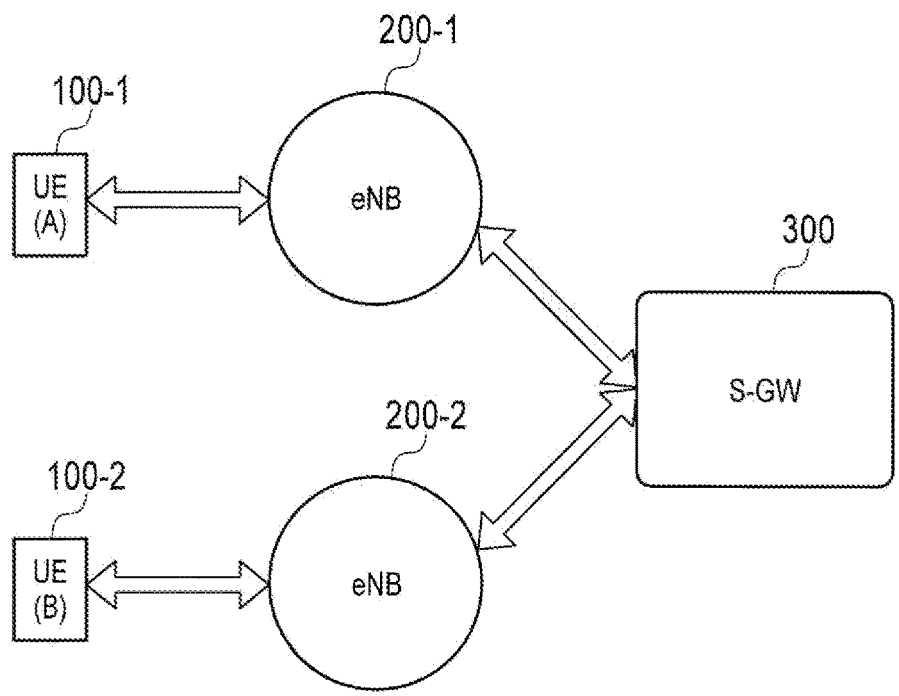
FIG. 6 is a diagram for illustrating a data path in cellular communication.

FIG. 6 illustrates a data path in the cellular communication. FIG. 6 illustrates the case in which the cellular communication is performed between UE 100-1 that establishes a connection with eNB 200-1 and UE 100-2 that establishes a connection with eNB 200-2. In addition, the data path indicates a transfer path of user data (a user plane).

As illustrated in FIG. 6, the data path of the cellular communication passes through the network. Specifically, the data path is set to pass through the eNB 200-1, the S-GW 300, and the eNB 200-2.

Figure 7:
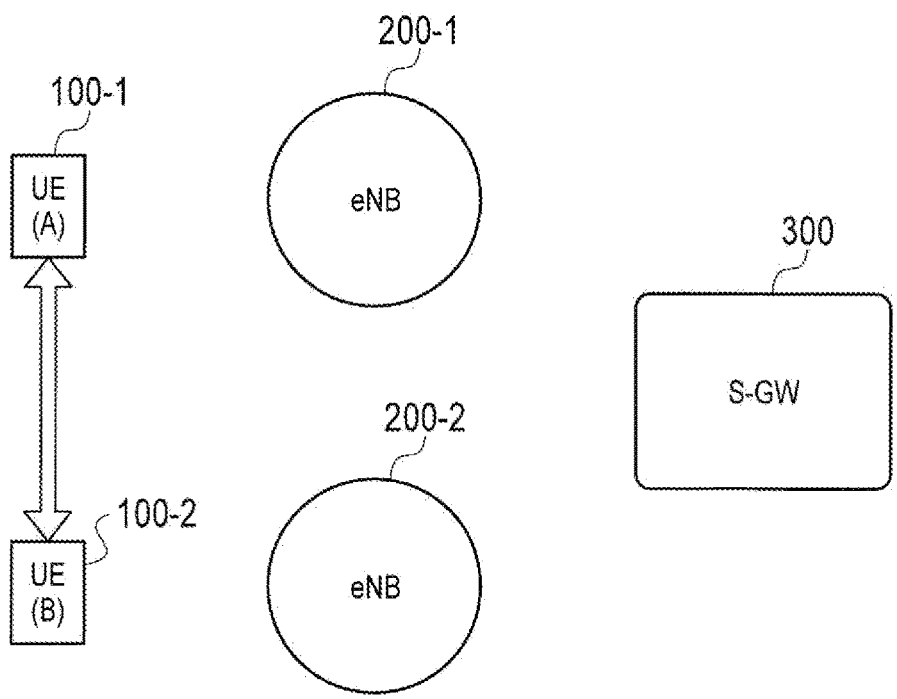
FIG. 7 is a diagram for explaining a data path in D2D communication.

FIG. 7 illustrates a data path in the D2D communication. In this case, FIG. 7 illustrates the case in which the D2D communication is performed between the UE 100-1 that establishes a connection with the eNB 200-1 and the UE 100-2 that establishes a connection with the eNB 200-2.

For example, one UE 100 of the UE 100-1 and the UE 100-2 discovers the other UE 100 existing in the vicinity of the one UE 100, so that the D2D communication starts. It is noted that in order to start the D2D communication, the UE 100 has a (Discover) function of discovering the other UE 100 existing in the vicinity of the UE 100. Furthermore, the UE 100 has a (Discoverable) function discovered by the other UE 100.

As illustrated in FIG. 7, the data path of the D2D communication does not pass through the network. That is, direct radio communication is performed between the UEs. As described above, when the UE 100-2 exists in the vicinity of the UE 100-1, the D2D communication is performed between the UE 100-1 and the UE 100-2, thereby obtaining an effect that a traffic load of the network and a battery consumption amount of the UE 100 are reduced, for example.

Furthermore, the D2D communication is considered to be performed in a frequency band (that is, in a frequency band of the cellular communication) of the LTE system, and for example, in order to avoid interference to the cellular communication, the D2D communication is performed under the control of the network (the eNB 200).

In the present embodiment, the D2D communication is performed in an uplink frequency band (that is, in an uplink frequency band of the cellular communication) of the LTE system.

Furthermore, in the present embodiment, D2D scheduling, which is radio resource assignment for the D2D communication, is performed at the initiative of the UE 100. In this case, the UE 100 is able to select a D2D radio resource. The eNB 200 transmits D2D resource information to the UE 100, wherein the D2D resource information indicates D2D assignment candidate radio resources that are radio resources available in the D2D communication. Furthermore, the D2D assignment candidate radio resources correspond to D2D radio resources available in the D2D communication.

Figure 8:
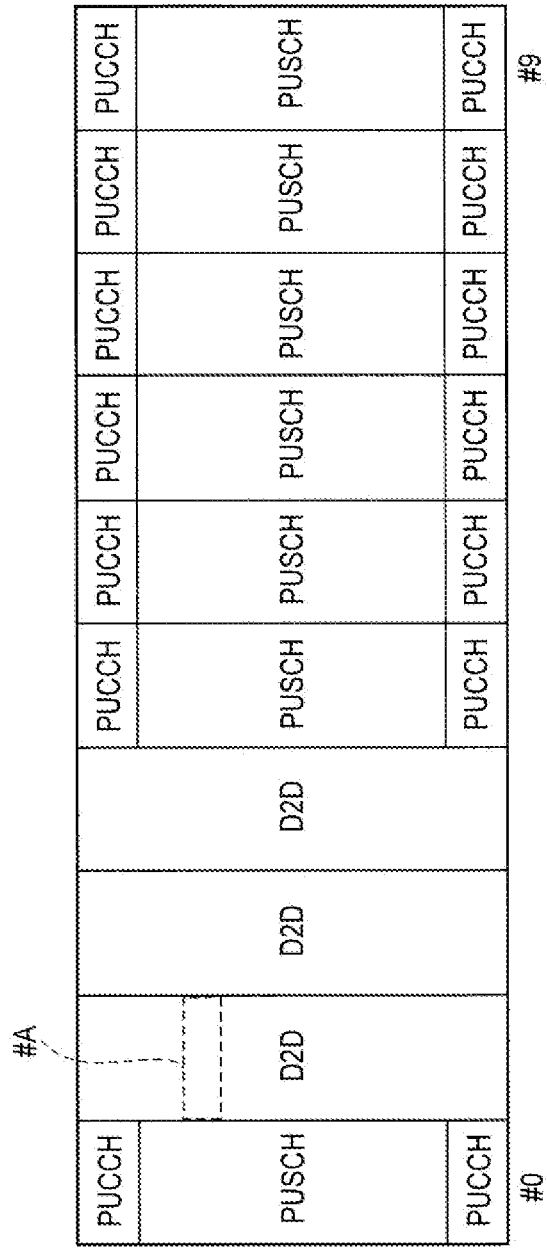
FIG. 8 is a diagram for illustrating a case in which D2D scheduling is performed at the initiative of UE.

FIG. 8 is a diagram for explaining a case in which D2D scheduling is performed at the initiative of UE. Furthermore, FIG. 8 illustrates each subframe corresponding to one radio frame in an uplink frequency band.

As illustrated in FIG. 8, the eNB 200 designates special subframes as the D2D assignment candidate radio resources. In the example of FIG. 8, subframes #1 to #3 within a radio frame are designated as the D2D assignment candidate radio resources.

When the D2D resource information indicating the D2D assignment candidate radio resources is received from the eNB 200, the UE 100 performing the D2D communication autonomously selects D2D radio resources (resource blocks) from the D2D assignment candidate radio resources indicated by the D2D resource information.

Operation According to First Embodiment

Figure 9:
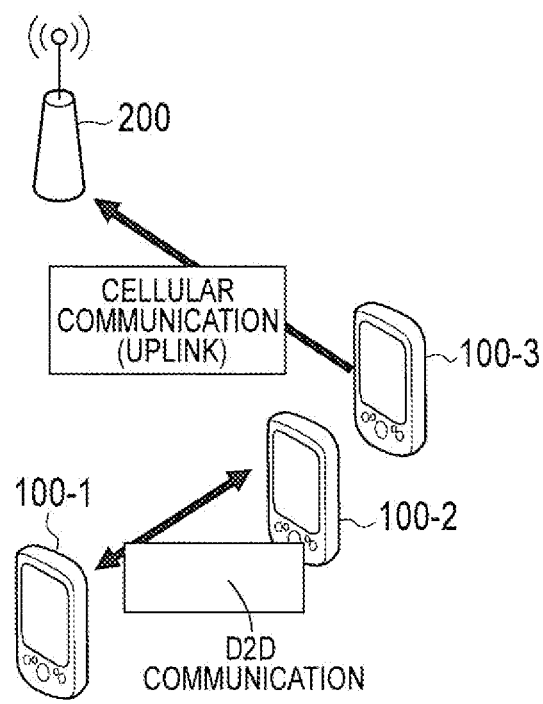
FIG. 9 is a diagram for illustrating a communication environment according to a first embodiment and a second embodiment.

Next, an operation according to the present embodiment will be described. FIG. 9 is a diagram for explaining a communication environment according to the present embodiment. In the present embodiment, a communication environment, in which the cellular communication and the D2D communication are simultaneously performed, is considered.

As illustrated in FIG. 9, UE 100-1 and UE 100-2 perform the D2D communication by using D2D radio resources (resource blocks) selected from the D2D assignment candidate radio resources. Each of the UE 100-1 and the UE 100-2 corresponds to the D2D communication terminal.

The UE 100-1 performs the D2D scheduling that is radio resource assignment for the D2D communication. That is, the UE 100-1 selects the D2D radio resources (the resource blocks) from the D2D assignment candidate radio resources notified from the eNB 200.

On the other hand, UE 100-3 performs the cellular communication with the eNB 200 by using radio resources (resource blocks) assigned from the eNB 200. Specifically, the UE 100-3 performs uplink communication with the eNB 200 by using uplink radio resources assigned from the eNB 200. The UE 100-3 corresponds to the cellular communication terminal.

Furthermore, when the D2D radio resources used in the D2D communication overlap the uplink radio resources used in the uplink communication, the D2D communication and the uplink communication interfere with each other. Therefore, it is difficult to allow the D2D communication and the uplink communication to coexist with each other.

In this regard, in the case of assigning the uplink radio resources from among the D2D assignment candidate radio resources, the eNB 200 according to the present embodiment transmits the uplink assignment information indicating the uplink radio resources to the UE 100-1.

For example, in FIG. 8, in the case of assigning a resource block #A included in the subframe #1 as the uplink radio resource, the eNB 200 transmits uplink assignment information indicating the resource block #A included in the subframe #1 to the UE 100-1.

The eNB 200 may transmit the uplink assignment information to the UE 100-1 by using a radio network temporary identifier (D2D-RNTI) dedicated for the D2D communication. In this case, the eNB 200 may transmit the uplink assignment information on the PDCCH or the PDSCH.

Alternatively, the eNB 200 may transmit the uplink assignment information to the D2D communication terminal in a broadcast manner. In this case, the eNB 200 may allow the uplink assignment information to be included in a system information block (SIB) and transmit the system information block (SIB).

The UE 100-1 uses the uplink assignment information received from the eNB 200 for D2D scheduling. Specifically, the UE 100-1 does not use the uplink radio resource, which is indicated by the uplink assignment information received from the eNB 200, for the D2D communication. For example, when information indicating the resource block #A included in the subframe #1 was received as the uplink assignment information, the UE 100-1 selects a D2D radio resource (a resource block) while avoiding the resource block #A included in the subframe #1.

Figure 10:
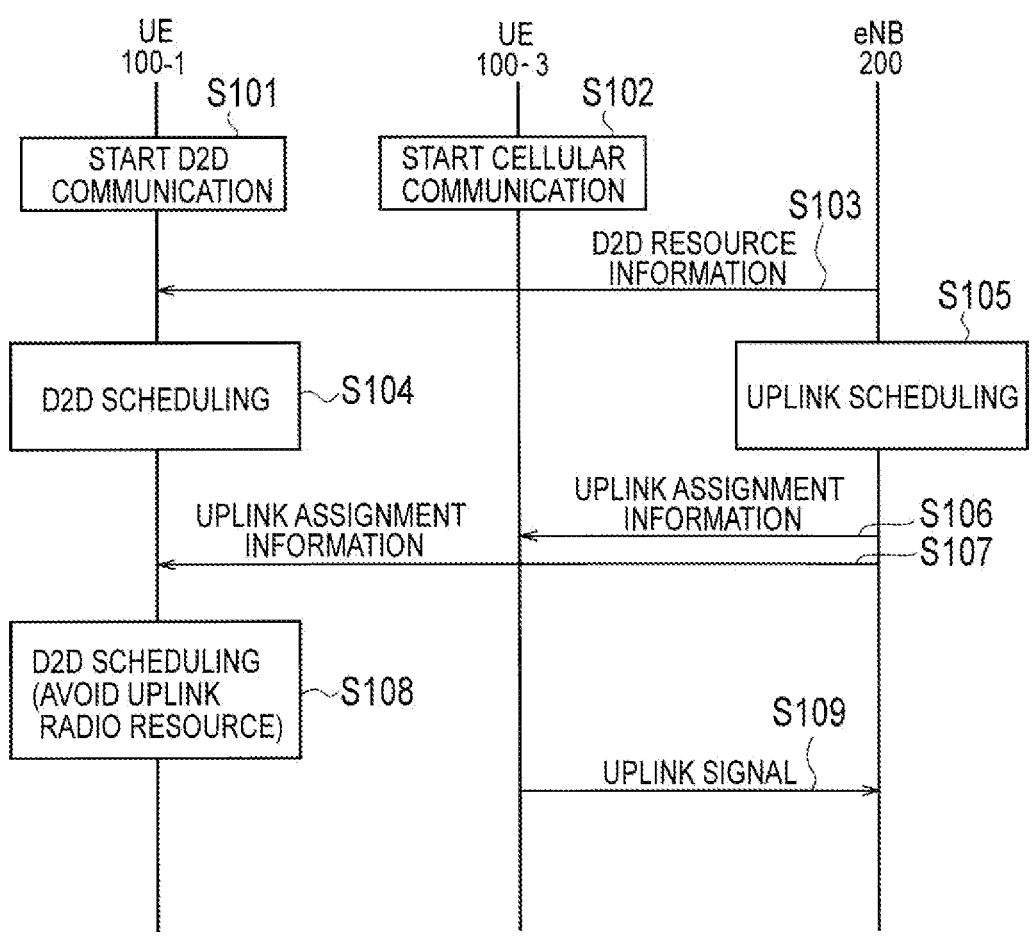
FIG. 10 is an operation sequence diagram according to the first embodiment.

FIG. 10 is an operation sequence diagram according to the present embodiment. Hereinafter, the UE 100-1 of the D2D communication terminals will be described as an example.

As illustrated in FIG. 10, in step S101, the UE 100-1 starts the D2D communication. In step S102, the UE 100-3 starts cellular communication.

In step S103, the eNB 200 transmits D2D resource information indicating D2D assignment candidate radio resources to the UE 100-1.

In step S104, the UE 100-1 performs D2D scheduling on the basis of the D2D resource information received from the eNB 200. Specifically, the UE 100-1 selects a D2D radio resource (a resource block) from the D2D assignment candidate radio resources. Then, the UE 100-1 and the UE 100-2 perform the D2D communication by using the D2D radio resource selected from the D2D assignment candidate radio resources.

In step S105, the eNB 200 performs uplink scheduling for determining an uplink radio resource to be assigned to the UE 100-3. Hereinafter, a description will be given on the assumption that a part of radio resources included in the D2D assignment candidate radio resources is determined, by the eNB 200, as the uplink radio resource to be assigned to the UE 100-3.

In step S106, the eNB 200 transmits uplink assignment information indicating the uplink radio resource determined in step S105 to the UE 100-3 on the PDCCH.

In step S107, the eNB 200 transmits the uplink assignment information indicating the uplink radio resource determined in step S105 to the UE 100-1. The eNB 200 may transmit the uplink assignment information to the UE 100-1 by using D2D-RNTI.

In step S108, the UE 100-1 performs the D2D scheduling such that the uplink radio resource indicated by the uplink assignment information received from the eNB 200 is not used for the D2D communication. Specifically, the UE 100-1 selects a radio resource (a resource block), other than the uplink radio resource indicated by the uplink assignment information, from the D2D assignment candidate radio resources. Then, the UE 100-1 and the UE 100-2 perform the D2D communication by using the D2D radio resource selected from the D2D assignment candidate radio resources.

In step S109, the UE 100-3 transmits an uplink signal to the eNB 200 by using the uplink radio resource indicated by the uplink assignment information received from the eNB 200. For example, the UE 100-3 transmits user data as the uplink signal to the eNB 200 on the PUSCH.

Consequently, according to the present embodiment, it is possible to perform the D2D scheduling such that interference is prevented from occurring between the D2D communication and the uplink communication.

In addition, the UE 100-3 transmits the uplink signal after four subframes of the reception of the uplink assignment information from the eNB 200. Thus, the UE 100-1 should perform a process for avoiding the uplink radio resource within the four subframes after the uplink assignment information is received from the eNB 200.

Second Embodiment

Hereinafter, the second embodiment will be described while focusing on the differences from the first embodiment.

In the present embodiment, the eNB 200 allows information, which indicates a modulation scheme that is applied to an uplink of the cellular communication by a cellular communication terminal (the UE 100-3), to be included in uplink assignment information, and transmits the uplink assignment information to a D2D communication terminal (the UE 100-1).

The D2D communication terminal (the UE 100-1) performs an interference cancellation process for interference received from the cellular communication terminal (the UE 100-3) on the basis of the information indicating the modulation scheme included in the uplink assignment information received from the eNB 200.

Figure 11:
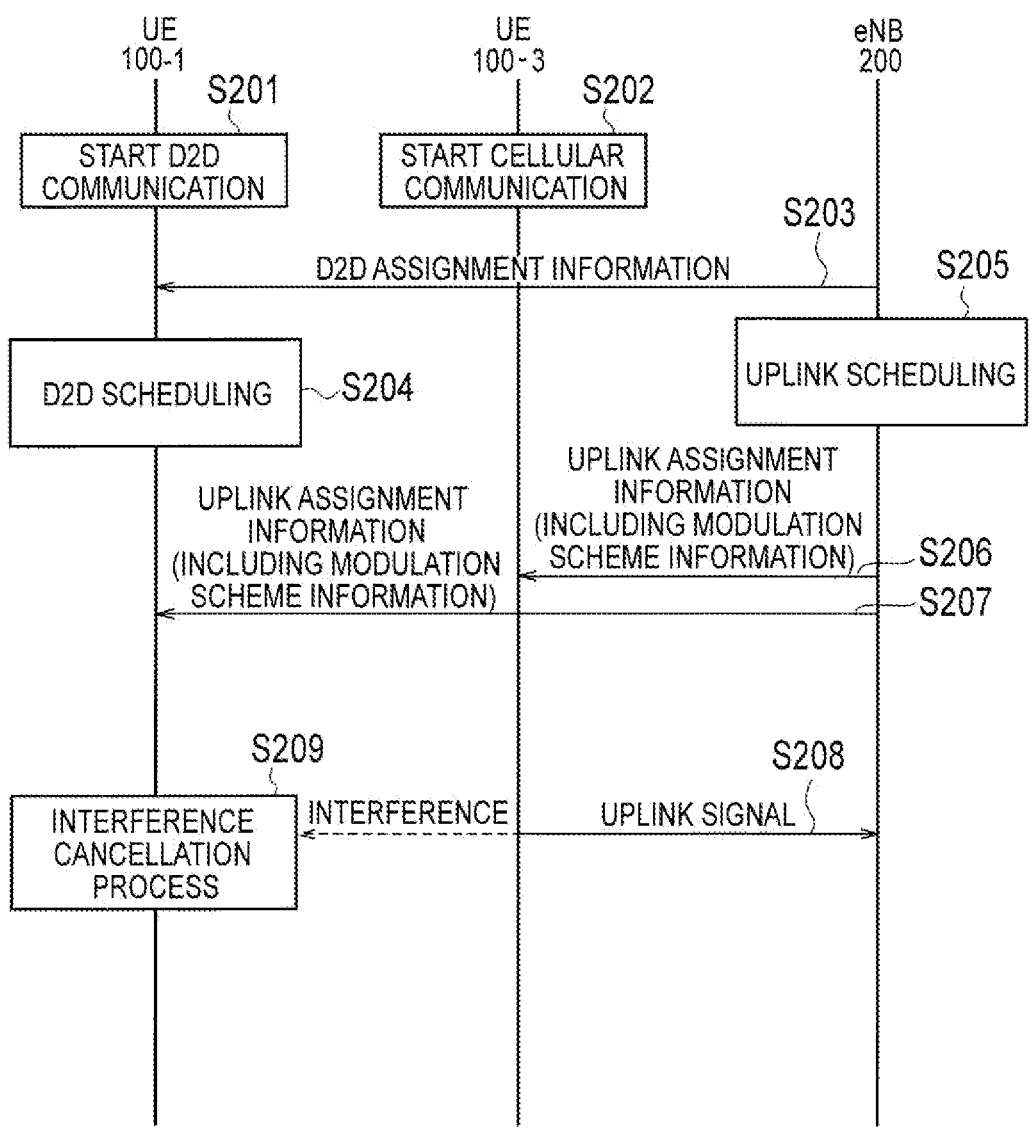
FIG. 11 is an operation sequence diagram according to the second embodiment.

FIG. 11 is an operation sequence diagram according to the present embodiment. Hereinafter, the UE 100-1 of the D2D communication terminals will be described as an example.

As illustrated in FIG. 11, in step S201, the UE 100-1 starts the D2D communication. In step S202, the UE 100-3 starts the cellular communication.

In step S203, the eNB 200 transmits D2D resource information indicating D2D assignment candidate radio resources to the UE 100-1.

In step S204, the UE 100-1 performs D2D scheduling on the basis of the D2D resource information received from the eNB 200. Specifically, the UE 100-1 selects a D2D radio resource (a resource block) from the D2D assignment candidate radio resources. Then, the UE 100-1 and the UE 100-2 perform the D2D communication by using the D2D radio resource selected from the D2D assignment candidate radio resources.

In step S205, the eNB 200 performs uplink scheduling for determining an uplink radio resource to be assigned to the UE 100-3. Furthermore, in the uplink scheduling, the eNB 200 determines a modulation scheme (an uplink modulation scheme) to be applied to uplink communication of the UE 100-3. Hereinafter, a description will be given on the assumption that a part of radio resources included in the D2D assignment candidate radio resources is determined, by the eNB 200, as the uplink radio resource to be assigned to the UE 100-3.

In step S206, the eNB 200 transmits uplink assignment information indicating the uplink radio resource determined in step S205 to the UE 100-3 on the PDCCH. The uplink assignment information includes modulation scheme information indicating the uplink modulation scheme determined in step S205.

In step S207, the eNB 200 transmits the uplink assignment information indicating the uplink radio resource determined in step S205 to the UE 100-1. The uplink assignment information includes modulation scheme information indicating the uplink modulation scheme determined in step S205. The eNB 200 may transmit the uplink assignment information and the modulation scheme information to the UE 100-1 by using D2D-RNTI.

In step S208, the UE 100-3 generates an uplink signal on the basis of the modulation scheme information included in the uplink assignment information received from the eNB 200. Furthermore, the UE 100-3 transmits the uplink signal to the eNB 200 by using the uplink radio resource indicated by the uplink assignment information received from the eNB 200. For example, the UE 100-3 transmits user data as the uplink signal to the eNB 200 on the PUSCH.

In step S209, the UE 100-1 performs an interference cancellation process for interference received from the UE 100-3 on the basis of the modulation scheme information included in the uplink assignment information received from the eNB 200. Specifically, the UE 100-1 generates a replica of an uplink signal by applying the modulation scheme indicated by the modulation scheme information, and performs a cancellation process using the generated replica. As such a method, MLD (Maximum Likelihood Detection) is available.

Consequently, according to the present embodiment, even when interference occurs between the D2D communication and the uplink communication, the D2D communication terminal is able to cancel the interference from the uplink communication.

Other Embodiments

Thus, the present invention has been described with the embodiments. However, it should not be understood that those descriptions and drawings constituting a part of the present disclosure limit the present invention. From this disclosure, a variety of alternate embodiments, examples, and applicable techniques will become apparent to one skilled in the art.

The aforementioned first embodiment and second embodiment describe an example in which the D2D scheduling is performed at the initiative of the UE. However, in the aforementioned second embodiment, as well as the case in which the D2D scheduling is performed at the initiative of the UE, the D2D scheduling may be performed at the initiative of the eNB. In this case, the eNB 200 determines the D2D radio resource. That is, the UE 100 has no selection right of the D2D radio resource. The eNB 200 notifies the UE 100 of the D2D radio resource assigned dynamically or semi-persistently. The UE 100 performs the D2D communication by using the assigned D2D radio resource.

Figure 12:
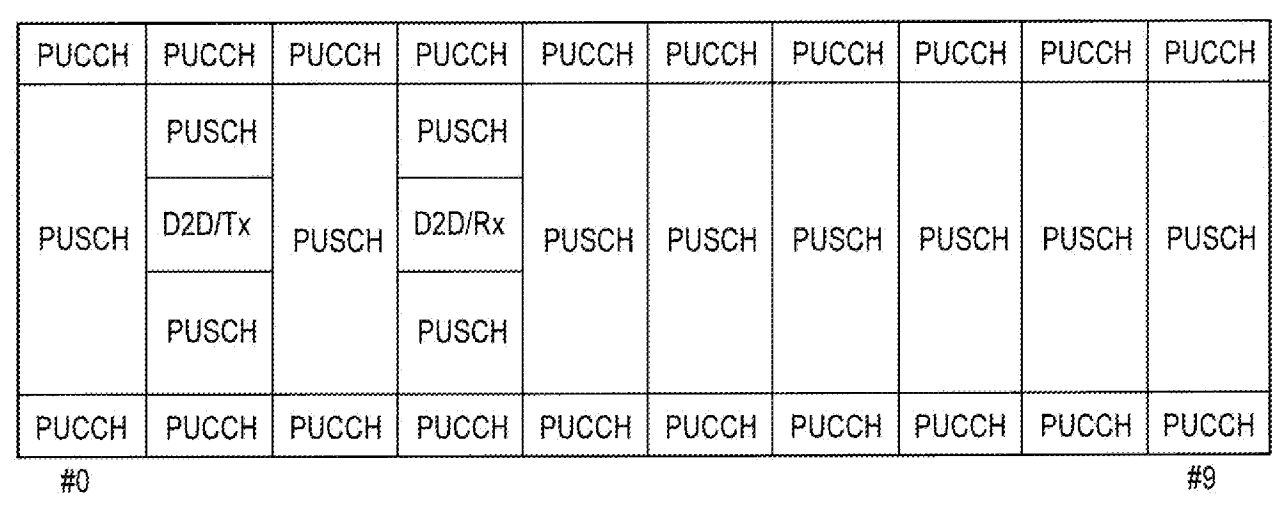

FIG. 12 is a diagram for explaining the case in which the D2D scheduling is performed at the initiative of the eNB. As illustrated in FIG. 12, the eNB 200 designates a specific resource block of a specific subframe as the D2D radio resource. In the example of FIG. 12, a part of resource blocks in a second subframe (a subframe #1) and a part of resource blocks in a fourth subframe (a subframe #3) within a radio frame are designated as the D2D radio resource. The UE 100 performing the D2D communication performs the D2D communication by using the D2D radio resource assigned from the eNB 200. In addition, transmission (Tx) in the second subframe (the subframe #1) indicates that one UE 100 transmits in the D2D communication and another UE 100 receives in the D2D communication. Reception (Rx) in the fourth subframe (the subframe #3) indicates that one UE 100 receives in the D2D communication and another UE 100 transmits in the D2D communication.

Further, in the above-described first embodiment and second embodiment, the D2D communication is performed in an uplink frequency band (that is, in an uplink frequency band of the cellular communication) of the LTE system; however, this is not limiting. The D2D communication may be performed in a downlink frequency band (that is, in a downlink frequency band of the cellular communication) of the LTE system. In this case, the eNB 200 transmits, as the assignment information, the downlink assignment information indicating the downlink radio resource, to the UE 100 that performs the D2D communication. The UE 100 receives the downlink assignment information. The downlink assignment information may include information indicating a modulation method applied to the downlink of the cellular communication. Further, the eNB 200 may transmit assignment information indicating the uplink radio resource and the downlink radio resource, to the UE 100 that performs the D2D communication.

Further, in the above-described first embodiment and second embodiment, after the eNB 200 performs the scheduling of the radio resource, that is, after determining the radio resource assigned to the UE 100 that performs the cellular communication, the assignment information indicating the determined radio resource is transmitted to the UE 100 that performs the D2D communication; however, this is not limiting. The eNB 200 may transmit, before deciding the radio resource assigned to the UE 100, the assignment information indicating a radio resource that may possibly be used by the UE 100 that performs the cellular communication (that is, a radio resource that may apply interference to the D2D communication, by the cellular communication), to the UE 100 that performs the D2D communication.

As the radio resource that may possibly be used by the UE 100 that performs the cellular communication, the following radio resources may be included:

(a) A radio resource retained, by the eNB 200, to be assigned to the uplink of the cellular communication for the UE 100 that performs the cellular communication (radio resource not yet being assigned to the UE 100 that performs the cellular communication)

(b) A radio resource to be preferentially assigned by the eNB 200, in the uplink and/or the downlink, to the UE 100 that performs the cellular communication for the coordination interference control with the other eNB 200 (another cell) (radio resource rather than the radio resource not to be preferentially assigned to the UE 100 that performs the cellular communication)

(c) Radio resource determined to be assigned previously, by the eNB 200, to the UE 100 that performs the cellular communication, when Semi Persistent Scheduling (SPS) for assigning a radio resource in every constant cycle is performed in the uplink and/or the downlink When the eNB 200 specifies the radio resource possibly to be used by the UE 100 that performs the cellular communication as described above, the eNB 200 may transmit the assignment information indicating the specified radio resource to the UE 100 that performs the cellular communication. In other words, the eNB 200 may dynamically notify the interference resource and also notify quasi-static interference resource.

Furthermore, in the aforementioned first embodiment and second embodiment, the FDD scheme is considered as the duplex scheme. However, the TDD scheme may be considered.

Further, in the above-described embodiments, as one example of the cellular communication system, the LTE system is described; however, the present invention is not limited to the LTE system, and the present invention may be applied to a cellular communication system other than the LTE system.

In addition, the entire content of U.S. Provisional Application No. 61/705,904 (filed on Sep. 26, 2012) is incorporated in the present specification by reference.

INDUSTRIAL APPLICABILITY

As described above, the mobile communication system, abase station and a user terminal according to the present invention are able to appropriately control D2D communication, and thus is useful for a mobile communication field.

The invention claimed is:
1. A mobile communication system, which supports cellular communication in which data communication is performed between a network and a user terminal and D2D communication in which data communication is directly performed among two or more user terminals, comprising:

a cellular communication terminal that is a user terminal that performs the cellular communication;

a D2D communication terminal that is a user terminal that performs the D2D communication; and a base station that assigns a radio resource that is used by the cellular communication terminal for the cellular communication, wherein the base station transmits assignment information to the D2D communication terminal, the assignment information indicating the radio resource that is already assigned by the base station to the cellular communication terminal from among D2D radio resources available in the D2D communication, and the D2D communication terminal uses the assignment information to determine D2D communication scheduling.

2. The mobile communication system according to claim 1, wherein, the radio resource is a radio resource that is used by the cellular communication terminal for an uplink of the cellular communication.

3. The mobile communication system according to claim 1, wherein the D2D scheduling indicates radio resource assignment for the D2D communication.

4. The mobile communication system according to claim 3, wherein the D2D communication terminal performing the D2D scheduling does not use the radio resource, which is indicated by the assignment information from the base station, for the D2D communication.

5. The mobile communication system according to claim 2, wherein the assignment information includes information indicating a modulation scheme to be applied to the uplink of the cellular communication by the cellular communication terminal.

6. The mobile communication system according to claim 5, wherein, on the basis of the information indicating the modulation scheme included in the assignment information, the D2D communication terminal performs an interference cancellation process for interference received from the cellular communication terminal.

7. The mobile communication system according to claim 1, wherein the base station transmits the assignment information to the D2D communication terminal by using a radio network temporary identifier dedicated for the D2D communication.

8. The mobile communication system according to claim 1, wherein the base station transmits the assignment information to the D2D communication terminal in a broadcast manner.

9. The mobile communication system according to claim 1, wherein the radio resource is a radio resource that is used by the cellular communication terminal for a downlink of the cellular communication.

10. A base station in a mobile communication system, which supports cellular communication in which data communication is performed between a network and a user terminal and D2D communication in which data communication is directly performed among two or more user terminals, comprising:

a controller configured to assign a radio resource that is used by a cellular communication terminal for the cellular communication, and a transmitter configured to transmit assignment information to a D2D communication terminal that performs the D2D communication, the assignment information indicating the radio resource that is already assigned by the controller to the cellular communication terminal from among D2D radio resources available in the D2D communication, wherein the assignment information is used by the D2D communication terminal to determine D2D communication scheduling.

11. A user terminal, which performs D2D communication in a mobile communication system that supports cellular communication in which data communication is performed between a network and a user terminal and the D2D communication in which data communication is directly performed among two or more user terminals, comprising:

a receiver configured to receive assignment information from a base station, the assignment information indicating a radio resource that is already assigned by the base station to a cellular communication terminal for the cellular communication from among D2D radio resources available in the D2D communication, and a controller configured to use the assignment information to determine D2D communication scheduling.

\* \* \* \* \*